(12) United States Patent
Christenbury

(10) Patent No.: US 7,243,694 B2
(45) Date of Patent: *Jul. 17, 2007

(54) RUN-FLAT SUPPORT RING WITH IMPROVED MOUNTING FEATURES

(75) Inventor: Damon Christenbury, Fountain Inn, SC (US)

(73) Assignee: Michelin Recherche et Technique S. A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/454,340

(22) Filed: Jun. 16, 2006

(65) Prior Publication Data

US 2006/0231182 A1    Oct. 19, 2006

Related U.S. Application Data

(63) Continuation of application No. PCT/US03/40577, filed on Dec. 19, 2003.

(51) Int. Cl.
*B60C 17/04* (2006.01)

(52) U.S. Cl. .................. 152/520; 152/152; 152/516

(58) Field of Classification Search ............. 152/520, 152/516, 379.4, 381.3–381.6, 158
See application file for complete search history.

(56) References Cited

U.S. PATENT DOCUMENTS

| | | | |
|---|---|---|---|
| 2,742,941 A | 4/1956 | Johnson | |
| 4,177,848 A | 12/1979 | Van der Burg | |
| 5,139,066 A | 8/1992 | Jarman | |
| 5,634,993 A | 6/1997 | Drieux et al. | |
| 5,891,279 A | 4/1999 | Lacour | |
| 6,415,839 B1 | 7/2002 | Pompier et al. | |
| 6,463,972 B1* | 10/2002 | Lacour | 152/158 |
| 6,564,842 B2 | 5/2003 | Abinal et al. | |
| 6,598,633 B1 | 7/2003 | Pompier | |
| 6,609,549 B2 | 8/2003 | Abinal et al. | |
| 6,955,202 B2 | 10/2005 | Chen | |
| 7,055,565 B2* | 6/2006 | Ishida et al. | 152/158 |
| 7,096,907 B2* | 8/2006 | Christenbury et al. | 152/516 |
| 7,104,302 B2* | 9/2006 | Christenbury et al. | 152/516 |
| 2003/0005991 A1 | 1/2003 | Drap | |
| 2003/0106625 A1 | 6/2003 | Drieux et al. | |
| 2003/0209301 A1 | 11/2003 | Pompier et al. | |

FOREIGN PATENT DOCUMENTS

| | | |
|---|---|---|
| EP | 1486356 A1 | 12/2004 |
| EP | 1356958 A1 | 1/2005 |
| EP | 1522427 A2 | 4/2005 |
| EP | 1559589 A1 | 8/2005 |
| WO | WO 01/08905 A1 | 2/2001 |
| WO | WO 01/32450 A1 | 5/2001 |

* cited by examiner

*Primary Examiner*—Jason R. Bellinger
(74) *Attorney, Agent, or Firm*—E. Martin Remick; Frank J. Campigotto; Adam Arnold

(57) ABSTRACT

A run-flat support ring, which is a component mounted upon a rim inside a tire to extend the distance the tire may travel at reduced or zero inflation pressure, is provided having one or more features that improve the process of mounting the support ring onto a rim and better tolerate variations, within manufacturing tolerances, in the respective diameters of the rim and the support ring.

20 Claims, 6 Drawing Sheets

RUN-FLAT SUPPORT RING WITH IMPROVED MOUNTING FEATURES

This application is a continuation of International Application No. PCT/US2003/040577, filed 19 Dec. 2003.

TECHNICAL FIELD OF THE INVENTION

The present invention relates to an improved design for a run-flat support ring, which is a component mounted upon a rim inside a tire to extend the distance the tire may travel at reduced or zero inflation pressure. More particularly, the present invention relates to a run-flat support ring with features that improve the process of mounting the support ring onto a rim and features that better tolerate variations, within manufacturing tolerances, in the relative diameters of the rim and the support ring

BACKGROUND OF THE INVENTION

Solutions have been proposed for assemblies that allow extended operation of a vehicle after a partial or total loss of air pressure. Many of these systems include multiple components that are complicated and time consuming to use or assemble. U.S. Pat. No. 5,891,279, which is incorporated herein in its entirety by reference, overcomes some of these difficulties. Such patent describes an assembly that includes a tire, a rim with a unique profile designed to accept the tire, and a deformable, but preferably circumferentially inextensible, run-flat support ring that is mounted over an essentially cylindrical bearing surface of the rim. The base of the support ring includes essentially inextensible, circumferentially oriented reinforcement elements to create an interference fit between the support and bearing surface of the rim. U.S. Patent Application Publication US2003/0005991, which is also incorporated herein in its entirety by reference, also describes a rim and run-flat support ring that includes a plurality of zones having protuberances on the bearing surface of the support but without a complementary depression in the rim.

The design of a run-flat support ring includes competing considerations of performance under run-flat conditions and assembly of the run-flat system. A certain amount of axial locating force is required when a run-flat support is mounted upon the rim. Preferably, this force is sufficiently low to allow proper seating of the support during mounting or dismounting. However, for run-flat operation, the force for unseating the ring from the rim must be sufficiently high so that the support maintains its proper position during reasonable vehicle operation. A run-flat support that optimizes these competing considerations is preferred.

Furthermore, even when manufactured within reasonable and acceptable tolerances, a run-flat support having a diameter that is within the low end of its manufacturing tolerance may be particularly difficult to mount and dismount with a rim having a diameter that is within the upper end of its manufacturing tolerance. A run-flat support that more readily tolerates variances of the support and rim within the allowed manufacturing tolerances is also preferred.

SUMMARY OF THE INVENTION

Objects and advantages of the invention will be set forth in part in the following description, or may be obvious from the description, or may be learned through practice of the invention.

The present invention provides a run-flat support ring having features that improve the mounting and dismounting requirements for the support ring while still providing a fit that maintains the lateral and circumferential position of the support ring during proper operation of the vehicle under conditions of partial or total loss of inflation pressure.

In one exemplary embodiment, the present invention provides a run-flat support ring for mounting inside a tire on a wheel rim. The wheel rim has at least one annular depression and one annular raised surface. The support ring includes a substantially cylindrical member that is configured for mounting around the wheel rim. This member has a radially outermost surface that is provided for contacting the tread strip region of the tire in the event of a loss of air pressure. This substantially cylindrical member also has a radially innermost surface for securing the member to the wheel rim. The radially inner-most surface includes the following features. First, this surface includes a plurality of circumferentially placed protuberances configured to engage the annular depression on the wheel rim. These protuberances, in combination with the annular depression, resist lateral displacement of the support ring from the rim. Second, it includes a plurality of circumferentially placed tabs configured for engaging the wheel rim proximate to the annular depression. These tabs operate to resist rotation of the support ring relative to the rim. Third, this surface includes a plurality of circumferentially positioned ribs, extending longitudinally along the axial direction, and configured for engaging the annular raised surface of the wheel rim. These protuberances facilitate mounting the support ring upon the rim. For certain embodiments, the tabs may be located at least partially between the protuberances. The tabs may also be rectangular in shape, although the present invention is not so limited. The ribs may be located axially adjacent to, and inboard of, the tabs; although, other configurations will be appreciated by one of ordinary skill in the art using the teachings disclosed herein. The protuberances may have numerous specified heights relative to the radial innermost surface. A height of about 1.7 mm or less in height relative to the radial inner-most surface is preferred for certain embodiments. Finally, the plurality of circumferentially located protuberances may include, in certain embodiments, between 8 to 12 such ribs that are equally spaced circumferentially about the radially innermost surface.

In another exemplary embodiment, the present invention provides a run-flat support ring for mounting on a wheel rim inside a vehicle's tire in order to support the tread strip region of the tire in the event of a loss of inflation pressure. The wheel rim has an axis about which rotation occurs during operation. The rim also defines an annular recess and defines a seat for the support ring that includes an outboard bearing surface and an inboard bearing surface. The inboard bearing surface is located at a greater radial distance from the axis of rotation than the outboard bearing surface. The support ring includes a substantially cylindrical base designed for placement around the wheel rim. The base defines a plurality of clips that are configured for positioning into the annular recess around the wheel rim. The support ring also includes a substantially cylindrical cap configured for contact with the tread strip region in the event of a sufficient loss of air pressure. The ring also includes a substantially cylindrically-shaped body connecting the base and the cap. This body defines a plurality of cavities that have openings that alternate between an inboard side and an outboard side of the tire.

In still another exemplary embodiment, the present invention provides a support member for mounting on a wheel rim within a tire. The wheel rim has a groove located circumferentially about a radially outermost surface of the wheel rim. The support member includes a substantially inextensible, circular body, configured for mounting upon the wheel rim. The member also has a radially inner-most surface that defines multiple raised segments, configured for placement within the groove of the rim. These raised segments each have a longitudinal axis that is oriented circumferentially along the radially innermost surface and are separated from one another by a predetermined distance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

Figure 1:
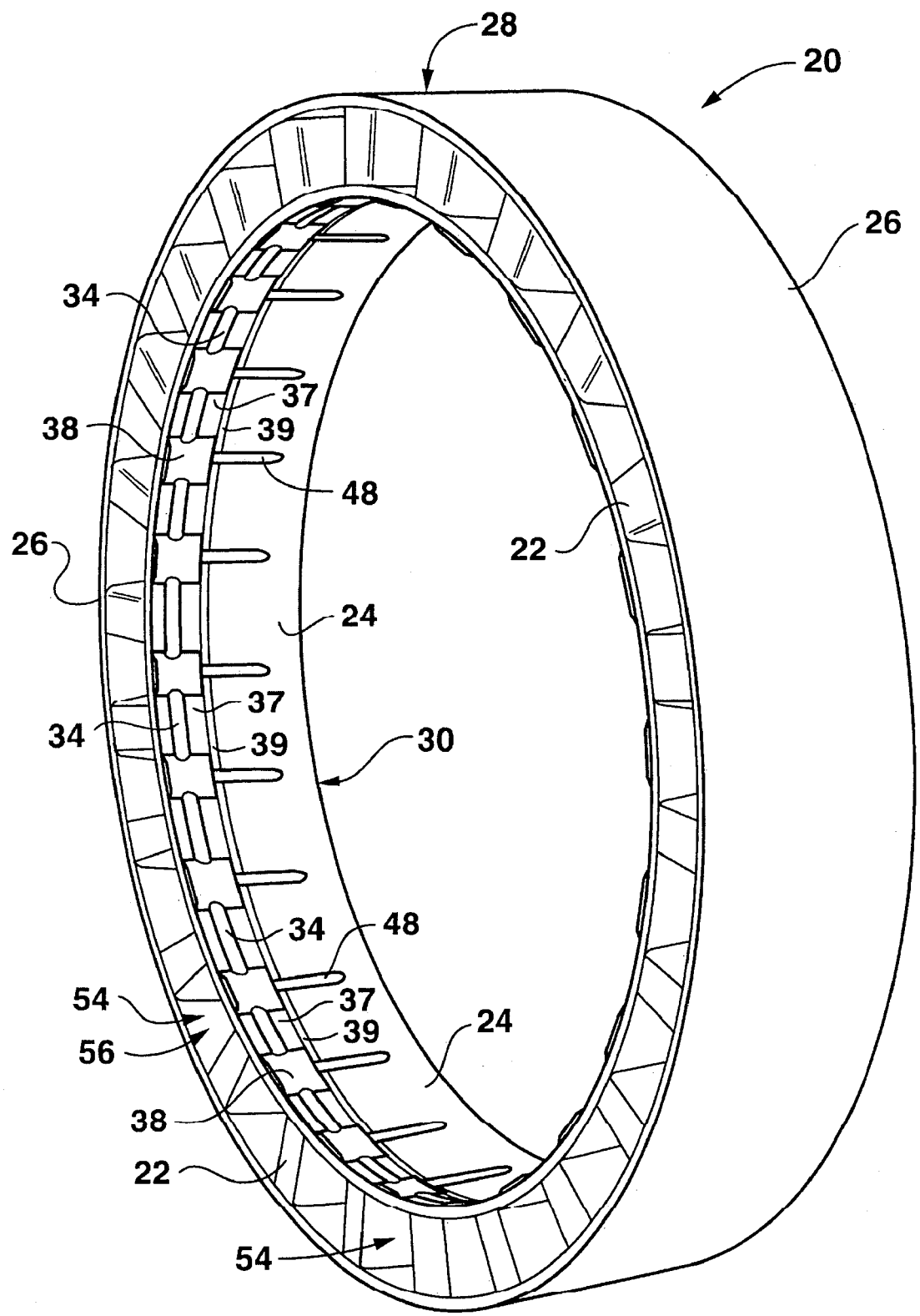
FIG. 1 is a perspective view of an exemplary embodiment of the present invention viewed from the outboard side.

Repeat use of reference characters in the present specification and drawings is intended to represent same or analogous features or elements of the invention.

DETAILED DESCRIPTION OF THE PREFERRED EMBODIMENTS

The present invention provides a support ring having improved mounting and dismounting characteristics and is for use inside a tire as part of a run-flat system for operation at reduced or zero inflation pressure. Reference will now be made in detail to embodiments of the present invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 2:
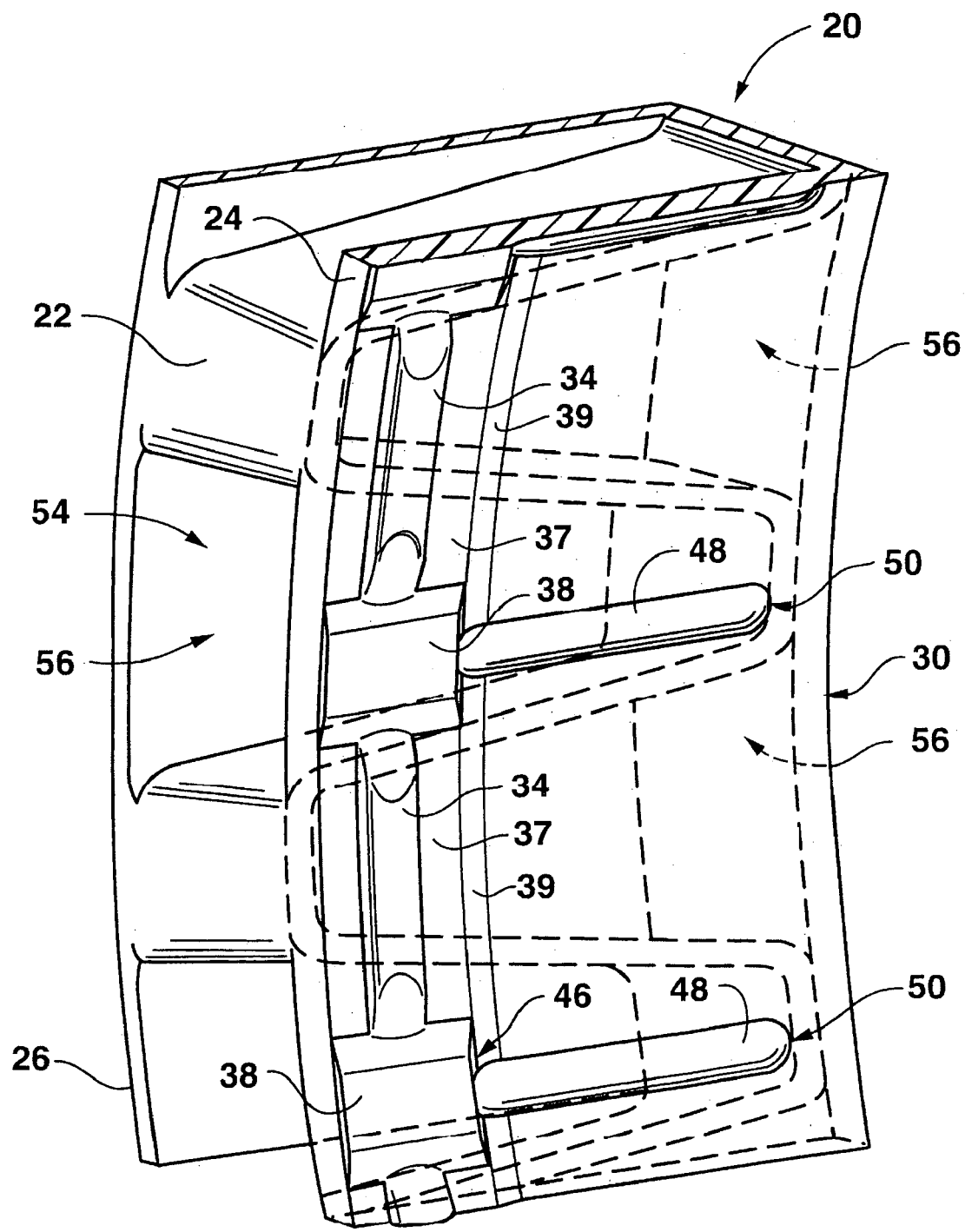
FIG. 2 is a perspective and close-up view of a section of the exemplary embodiment illustrated in FIG. 1.
Figure 3:
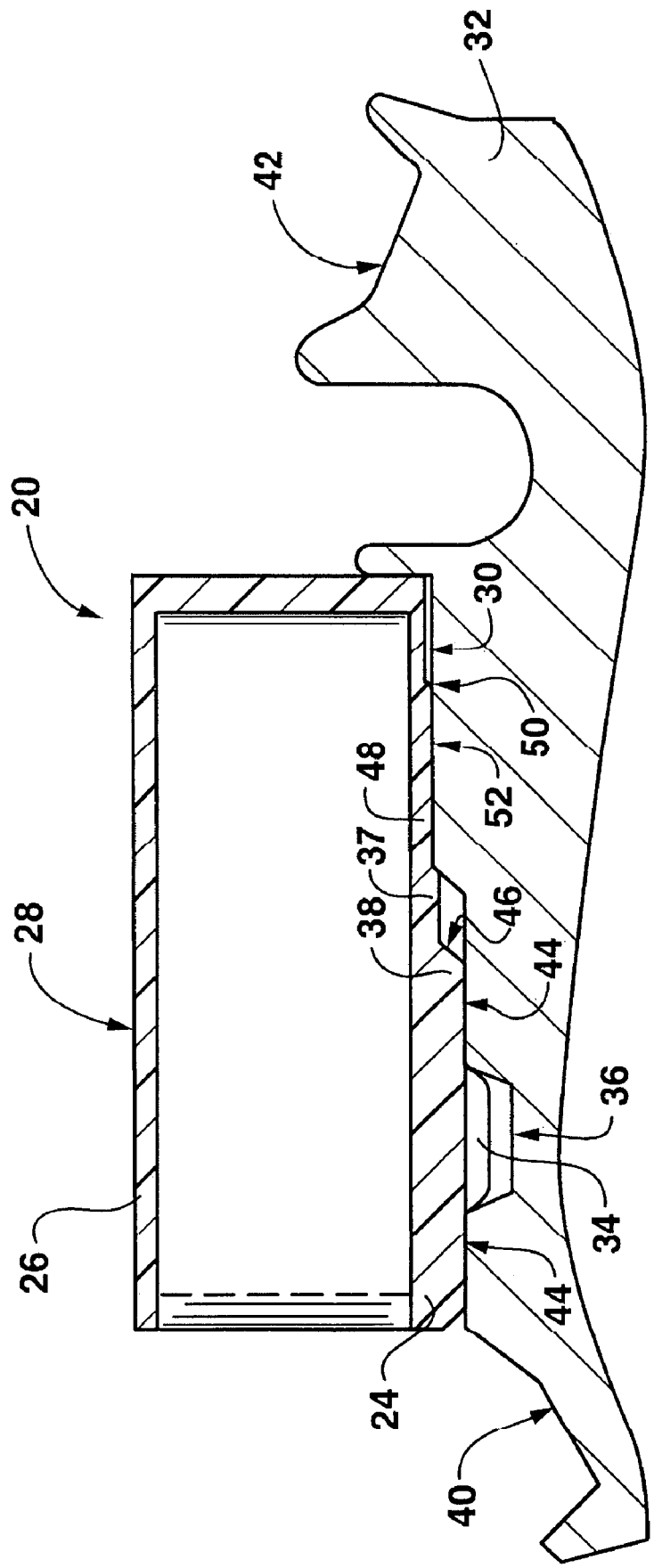
FIG. 3 is a cross-section view of the exemplary embodiment of FIG. 1 as mounted upon a representative rim.

An exemplary embodiment of the present invention is depicted in FIGS. 1 through 3. A run-flat support ring 20, also referred to as a support ring, is provided with a substantially cylindrically-shaped body 22 that connects a substantially cylindrical base 24 to a substantially cylindrical cap 26. Support ring 20 is placed over a rim 32 (FIG. 3) as part of a run-flat tire system. One of ordinary skill in the art will understand the process by which a support ring is placed within a tire and mounted upon a rim 32 by rotating the assembly and applying certain lateral forces until properly seating the run-flat assembly. During zero or low-pressure operation of the properly mounted support ring 20, radially outermost surface 28 of support ring 20 contacts the inner surface of the tire, referred to herein as the tread strip region, to provide improved handling characteristics during reasonable vehicle operation.

Radially inner-most surface 30 is supported upon rim 32 of the run-flat tire system. As shown in FIG. 3, when properly positioned upon rim 32, support ring 20 rests upon a support ring seat that includes outboard bearing surface 44 and inboard bearing surface 52. A plurality of protuberances 34, also referred to as clips, are defined by surface 30 of support ring 20 and positioned along the circumferential direction of run-flat support ring 20. Each protuberance 34 is positioned within an annular recess 36 defined by rim 32. For the exemplary embodiment of FIGS. 1 through 3, each protuberance 34 may have a height of about 1.7 mm or less relative to radially inner-most surface 30. As support ring 20 is substantially inextensible, protuberances 34 resist dismounting or movement of support ring 20 in the axial direction during reasonable vehicle operation.

Figure 6:
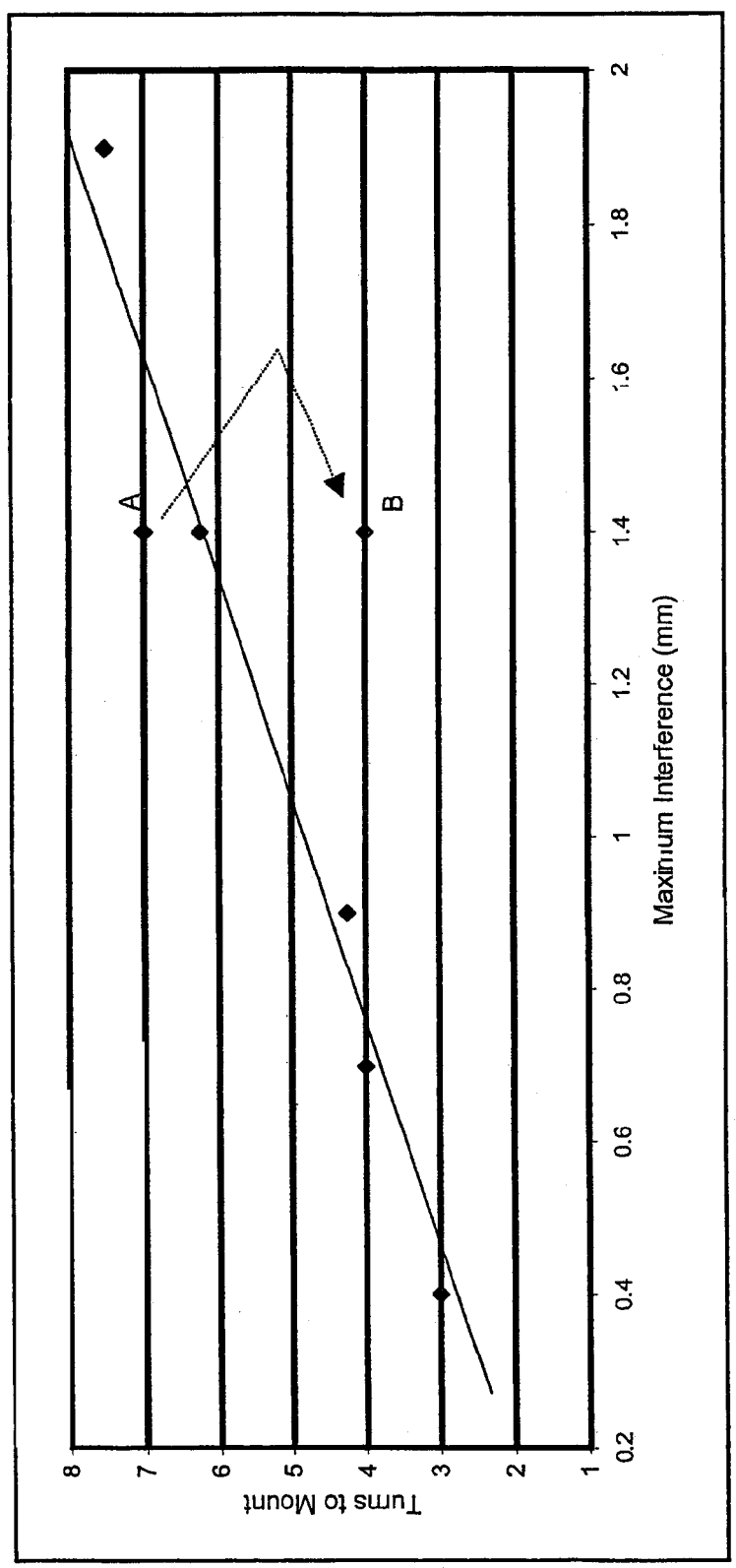
FIG. 6 is a plot of certain data as described more fully below.

Rather than a plurality of spaced or segmented protuberances 34 as shown in FIGS. 1 and 2, previous support rings have included a continuous clip or protuberance oriented circumferentially along the radially innermost surface and typically configured for positioning within a recess on the rim. One part of applicant's invention is the discovery that segmenting this continuous clip into a plurality of spaced protuberances 34, as shown for example in FIGS. 1 and 2, provides improved mounting and dismounting characteristics for support ring 20. FIG. 6 illustrates the effect of segmentation of the continuous clip into a plurality of clips or protuberances. One of ordinary skill in the art will understand the process by which a support ring is mounted upon a rim by rotating the rim while a lateral force is applied to seat the ring onto the rim. In FIG. 6, the x-axis represents the amount of interference between the protuberances or clips on a support ring and the mounted rim. The y-axis represents the number of times the rim had to be turned during the mounting process in order to properly seat the support ring onto the rim.

One design objective for a support ring is to minimize the number of turns required to mount the support ring onto the rim. As represented by a line drawn through the data in FIG. 6, as the amount of interference increases the number of turns required to mount the support ring also increases. Applicant determined that for a given interference, the number of turns required to mount the support ring decreased significantly by segmenting the continuous clip into a plurality of protuberances or clips. For example, for an interference of 1.4 mm, removing 100 mm from an otherwise continuous clip to create a plurality of protuberances or clips about the circumference of the support ring had the effect of decreasing the number of turns required to mount the support ring from 7 turns (Point A) to 4 turns (Point B) as depicted in FIG. 6. The result represents a substantial improvement in the time and labor required for mounting the support ring. Additional testing also revealed that separating the continuous clip into a plurality of protuberances or clips could be accomplished without unacceptably compromising the ability of the support ring to resist dismounting from the rim when operating forces are applied—such as when the vehicles turns or impacts a curb during reasonable operation at low or zero inflation pressures. It should be understood that an improvement in mounting characteristics can be achieved by removing only a single section of about 10 mm in length from a clip that is otherwise continuous circumferentially about the inner surface of the support ring, and such is within the scope of the present invention. This single discontinuity provides for a thread-like effect as the support ring is turned relative to the rim during the mounting process. Preferably, however, multiple discontinuities (which create a plurality of clips) are uniformly spaced about the inner surface of the support ring to further enhance this thread-like effect.

Returning to the discussion of the exemplary embodiment of FIGS. 1 through 3, a plurality of rotation resisting surfaces or tabs 38 are spaced about run-flat support ring 20. For this exemplary embodiment, each individual tab 38 is at least partially located between two protuberances 34. By way of example only, each tab 38 may have a height of about 1.5 mm or less relative to radially inner-most surface 30.

During mounting, support ring 20 is moved onto rim 32 in the inboard direction, which in FIG. 3 is a direction from outboard rim seat 40 towards inboard rim seat 42. As this movement takes place, rim 32 contacts an annular band 37 defined by radially-innermost surface 30. Contact with band 37 occurs first along the sloped, inboard edge 39 of surface 30. As shown in FIG. 2, the slope of edge 39 is preferably at an angle of about 30 degrees and facilitates positioning of the support ring 20. Using the teachings disclosed herein, one of ordinary skill in the art will appreciate that other slope angles may be used. As lateral movement of the support ring 20 continues in the inboard direction, tab 38 makes contact with rim 32 along outboard bearing surface 44. The inboard edge 46 of each tab 38 is also sloped to provide a slight ramp. This feature also further facilitates the placement of support ring 20 onto rim 32 during the mounting process and provides a means of compensating for variations within manufacturing tolerances for support ring 20 and rim 32. As shown in FIG. 3, once support ring 20 is in the proper position, tabs 38 contact rim 32 along portions of outboard bearing surface 44 that are adjacent to annular recess 36. The interference between tab 38 and rim 32 helps secure the position of support ring 20 and provides resistance against the undesirable rotation of support ring 20 relative to rim 32 during reasonable vehicle operation.

Referring to FIG. 1 and FIG. 2, also positioned upon radially inner-most surface 30 are a plurality of ribs 48 that are each located axially adjacent to, and to the inboard side of, tabs 38. Each rib 48 is longitudinally oriented along the axial direction. For the exemplary embodiment being discussed, each rib 48 has a height of about 1.2 mm or less relative to radially inner-most surface 30 and also has a height slightly less than protuberance 34. As support ring 20 is moved onto rim 32 during the mounting process, inboard edge 50 of rib 48 makes contact with inboard bearing surface 52. To enhance the ease by which that support ring 20 is mounted onto rim 32, the inboard edge 50 of each rib 48 is curvilinear in shape as shown in FIG. 2. This feature, like inboard edge 46, also helps to ensure the support ring 20 can be more readily mounted despite variations in the size of the support ring 20 and rim 32 within manufacturing tolerances. Once support ring 20 is in position as shown in FIG. 3, ribs 48 contribute to the interference fit between support ring 20 and rim 32 and thereby help secure the assembly. More specifically, inboard bearing surface 52 is at a greater radial distance from the axis of rotation of rim 32 than outboard bearing surface 44, and ribs 48 provide an interference fit through contact with inboard bearing surface 52.

As shown in FIG. 1 and FIG. 2, cylindrically-shaped body 22 has a plurality of cavities 54. These cavities 54 are created by a winding pattern, along the circumferential direction, of body 22. Cavities 54 are longitudinally oriented along the axial direction and have openings 56 in an alternating pattern between the inboard and outboard sides of support ring 20. Although not required, preferably each tab 38 is located radially adjacent to the opening 56 of at least one of such cavities 54. The overall shape of body 22 can be varied as can the relative width and length of protuberances 34, tabs 38, and ribs 48.

Run-flat support ring 20 can be constructed from a variety of different materials. In general, a material having a tensile modulus at 10 percent strain of 10 to 100 MPa should be used. By way of example, but not limitation, suitable materials include polyurethane, thermoplastic elastomers, and rubber. Additionally, while body 22, base 24, and cap 26 may be individually constructed and combined to create support ring 20, preferably these parts are molded as a single component to create support ring 20. It should also be noted that while the present description has been provided using the particular configuration for a rim 32 as shown in FIGS. 1 through 3, the present invention is not limited to any particular rim configuration as will be understood by one of skill in the art using the teachings disclosed herein.

Figure 4:
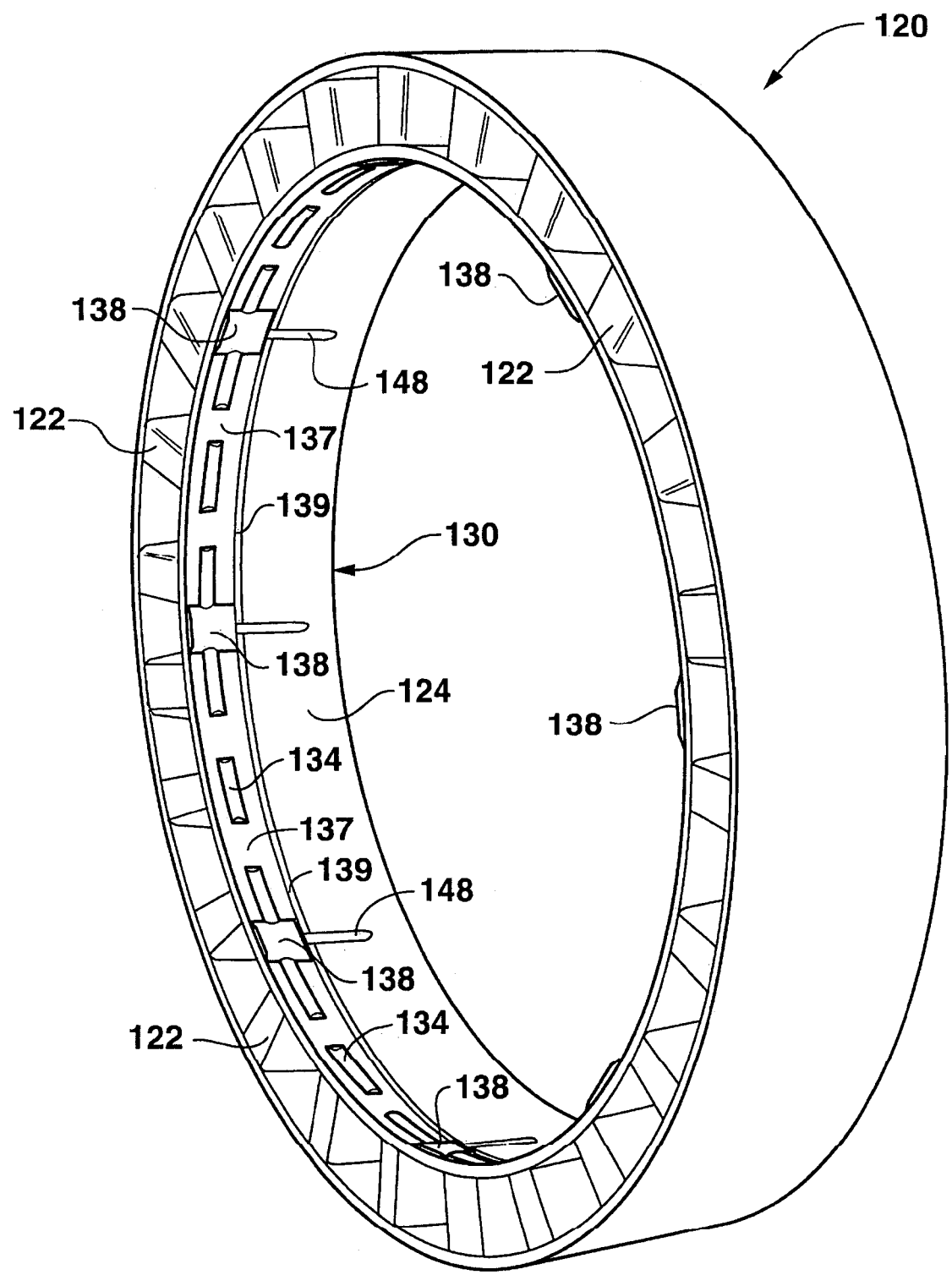
FIG. 4 is a perspective view of another exemplary embodiment of the present invention viewed from the outboard side.
Figure 5:
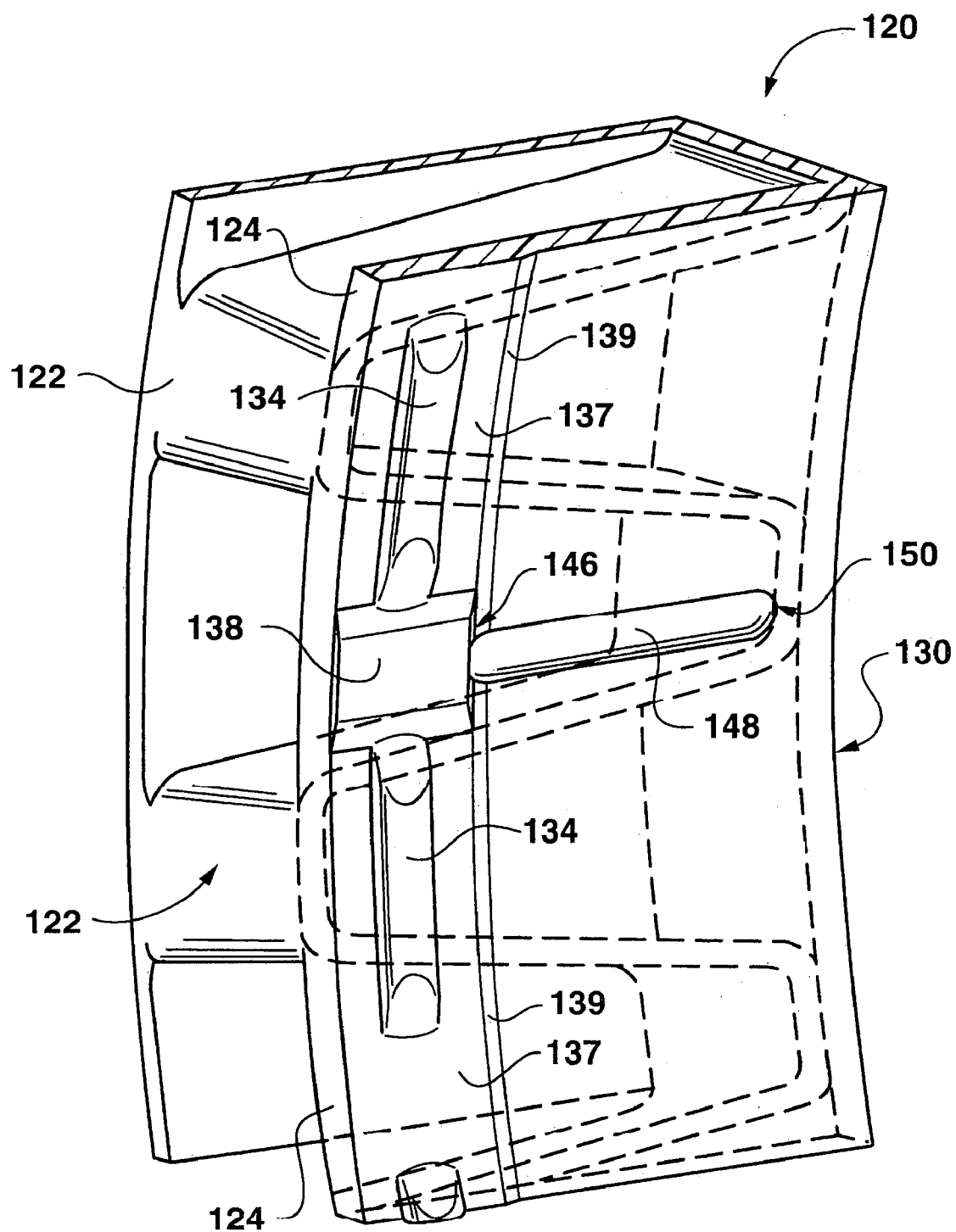
FIG. 5 is a perspective and close-up view of a section of the exemplary embodiment illustrated in FIG. 4.

Additionally, using the teachings disclosed herein, one skilled in the art will appreciate numerous other variations and alternative embodiments that fall within the spirit of the invention and scope of the claims set forth below. By way of example only, one such alternative embodiment of the present invention is depicted in FIGS. 4 and 5. A run-flat support 120 is provided having a substantially cylindrically-shaped body 122, a substantially cylindrical base 124, and a substantially cylindrical cap 126. As with previously discussed embodiments, support 120 is provided with a plurality of clips or protuberances 134 that are spaced circumferentially along radially inner-most surface 130. Protuberances 134 also fit into a recess on a rim of a run-flat support system to provide resistance against axial displacement of support 120 from a rim.

Unlike previously discussed exemplary embodiments, support 120 does not include a tab between each of the protuberances 134. Instead, eight tabs 138 are equally spaced about radially inner-most surface 130 of support 120. Each tab 138 includes a sloped inboard edge 146 to facilitate the mounting of support 120 upon a tire rim as previously described. Additionally, a plurality of ribs 148 are also provided at positions axially adjacent to teach tab 138 and are longitudinally oriented along the axial direction of support 120. Each rib 148 has an inboard edge 150 that is curvilinear in shape to further enhance the mounting of support 120 onto a rim as also previously described.

Multiple variations of the present invention are possible wherein different numbers of tabs 138 and ribs 148 are positioned at different locations about radially inner-most surface 130. Applicant has determined that between about eight to twelve tabs are preferred for certain applications. However, the present invention is not so limited.

Using the teachings disclosed herein, variations can be used to tune or optimize the run-flat support ring for the specific application under consideration while also providing a support ring that is more readily mounted and dismounted from the rim and still functioning to support the tread strip region during reasonable vehicle operation in period of low or zero inflation pressure. It should be appreciated by those skilled in the art that modifications and variations can be made to the support ring as described herein, without departing from the scope and spirit of the claims. It is intended that the invention include such modifications and variations as come within the scope of the appended claims and their equivalents.

What is claimed:

1. A run-flat support ring for mounting inside a tire on a wheel rim, said tire having a tread strip region, said wheel rim having at least one annular depression and one annular raised surface, comprising:
   a substantially cylindrical member configured for mounting around said wheel rim, said member having a radially outermost surface for contacting said tread strip region of said tire in the event of a loss of air pressure, said member having a radially innermost surface for securing said member to said wheel rim, said radially inner-most surface including i) a plurality of circumferentially placed protuberances configured to engage said depression; ii) a plurality of circumferentially placed tabs configured for engaging said wheel rim proximate to said depression; and iii) a plurality of circumferentially placed ribs, extending longitudinally along the axial direction, and configured for engaging said annular raised surface.

2. A run-flat support ring as in claim 1, wherein said tabs are located at least partially between said protuberances.

3. A run-flat support ring as in claim 2, wherein said tabs are rectangular in shape.

4. A run-flat support ring as in claim 1, wherein said ribs are located axially adjacent to, and inboard of, said tabs.

5. A run-flat support ring as in claim 1, wherein said protuberances are about 1.7 mm or less in height relative to said radial inner-most surface.

6. A run-flat support ring as in claim 1, wherein said plurality of circumferentially placed ribs is comprised of about 8 to 12 said ribs, equally spaced circumferentially about said radially innermost surface.

7. A run-flat support ring for mounting on a wheel rim inside a vehicle's tire in order to support the tread strip region of said tire in the event of a loss of inflation pressure, said wheel rim having an axis about which rotation occurs during operation, said wheel defining an annular recess and also defining a seat for said support that includes an outboard bearing surface and an inboard bearing surface, wherein the inboard bearing surface is located at a greater radial distance from said axis than said outboard bearing surface, said support comprising:
   a substantially cylindrical base designed for placement around said wheel rim, said base defining a clip that is circumferentially oriented and configured for positioning into said annular recess; said clip having at least one discontinuity of at least about 10 mm along said clip's circumference;
   a substantially cylindrical cap configured for contact with said tread strip region in the event of a sufficient loss of air pressure; and
   a substantially cylindrically-shaped body connecting said base and said cap, said body defining a plurality of cavities having openings that alternate between an inboard side and an outboard side of said tire.

8. A run-flat support ring for mounting on a wheel rim as in claim 7, wherein said substantially cylindrical base further comprises a plurality of projecting surfaces configured for contacting said wheel rim adjacent to said annular recess.

9. A run-flat support ring for mounting on a wheel rim as in claim 8, wherein each of said plurality of projecting surfaces is located along the outboard side of said base and radially adjacent to one of said openings of said plurality of cavities.

10. A run-flat support ring for mounting on a wheel as in claim 7, wherein said substantially cylindrical base further comprises:
   a plurality of first projecting surfaces configured for contacting said wheel rim adjacent to said annular recess; and
   a plurality of second projecting surfaces oriented longitudinally in the axial direction, positioned on said substantially cylindrical base inboard of and adjacent to said plurality of first projecting surfaces, and configured for contact with said wheel rim.

11. A run-flat support ring for mounting on a wheel rim as in claim 7, wherein said substantially cylindrical base further comprises a plurality of projecting surfaces oriented longitudinally in the axial direction, and configured for contact with said wheel rim.

12. A run-flat support ring for mounting on a wheel rim as in claim 7, wherein said substantially cylindrical base further comprises:
   a plurality of first projecting surfaces configured for contacting said wheel rim adjacent to said annular recess; and
   a plurality of second projecting surfaces oriented longitudinally in the axial direction, positioned on said substantially cylindrical base inboard of and adjacent to said plurality of first projecting surfaces, and configured for contact with said inboard bearing surface of said wheel rim.

13. A run-flat support ring for mounting on a wheel rim as in claim 12, wherein said each of said first projecting surfaces is about 1.7 mm or less in height.

14. A run-flat support ring for mounting on a wheel rim as in claim 13, wherein the inboard end of each of said plurality of second projecting surfaces is curvilinear in shape.

15. A run-flat support ring for mounting on a wheel rim as in claim 12, wherein each of said plurality of second projecting surfaces is about 1.2 mm or less in height.

16. A run-flat support ring for mounting on a wheel rim within a tire, the wheel rim having a groove located circumferentially about a radially outermost surface of the wheel rim, said support member comprising:
   a substantially inextensible, circular body, configured for mounting upon said wheel rim and having a radially inner-most surface that defines multiple raised segments, configured for placement within said groove, wherein said raised segments each have a longitudinal axis that is oriented circumferentially along said radially innermost surface and are separated from one another by a predetermined distance of at least about 10 mm.

17. A run-flat support ring for mounting on a wheel rim within a tire as in claim 16, further comprising multiple, rotation-resisting surfaces defined by said radially innermost surface and individually located between at least two of said raised segments.

18. A run-flat support ring for mounting on a wheel rim within a tire as in claim 17, further comprising multiple ribs positioned upon said radially inner-most surface, each of said ribs extending from one of said multiple, rotation-resisting surfaces, and each of said ribs being longitudinally oriented along the axial direction.

19. A run-flat support ring for mounting on a wheel rim within a tire as in claim 18, wherein said substantially inextensible, circular body defines multiple, axially oriented cavities having openings that alternate between inboard and outboard sides of said tire.

20. A run-flat support ring for mounting on a wheel rim within a tire as in claim 19, wherein each of said multiple, rotation resisting surfaces is located radially adjacent to one of said openings to said multiple, axially oriented cavities.

* * * * *